Figure 1:
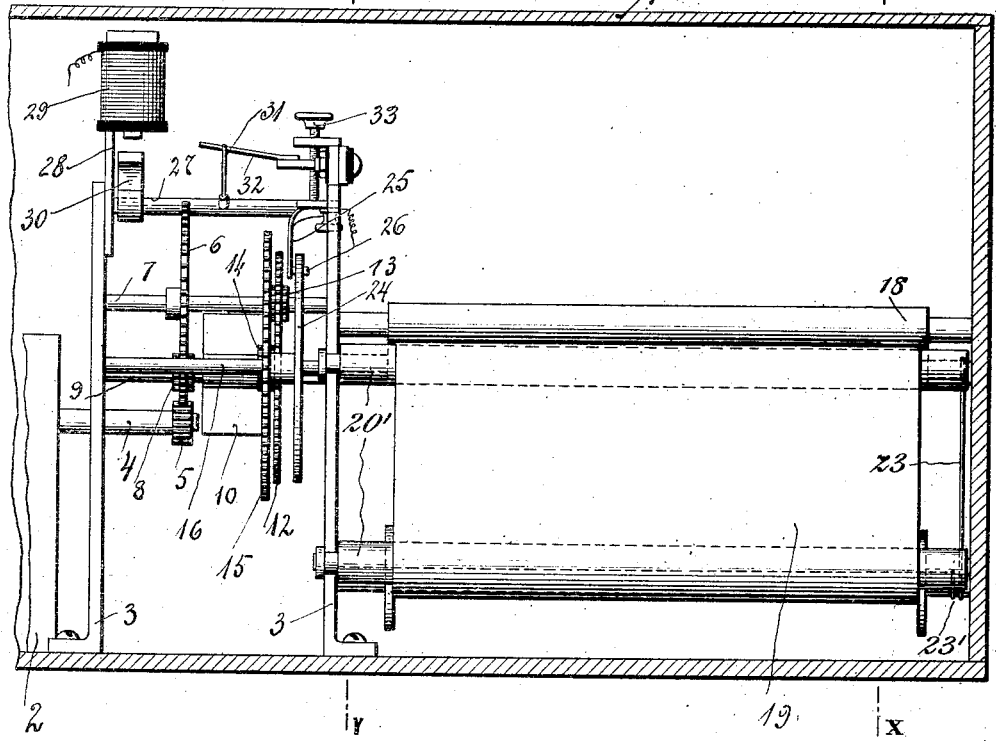

S. B. MOSCOVITZ.
EXHIBITING APPARATUS.
APPLICATION FILED SEPT. 20, 1906.

942,008.

Patented Nov. 30, 1909.
5 SHEETS—SHEET 1.

Witnesses
Max B. Doring.
Johanne Daumberger.

Inventor
Samuel B. Moscovitz
By his Attorney
Max D. Ordmann

S. B. MOSCOVITZ.
EXHIBITING APPARATUS.
APPLICATION FILED SEPT. 20, 1906.

942,008.

Patented Nov. 30, 1909.

5 SHEETS—SHEET 2.

Witnesses
Max B. H. Doring
Johanne Daumberger

Inventor
Samuel B. Moscovitz
By his Attorney
Max D. Ordmann

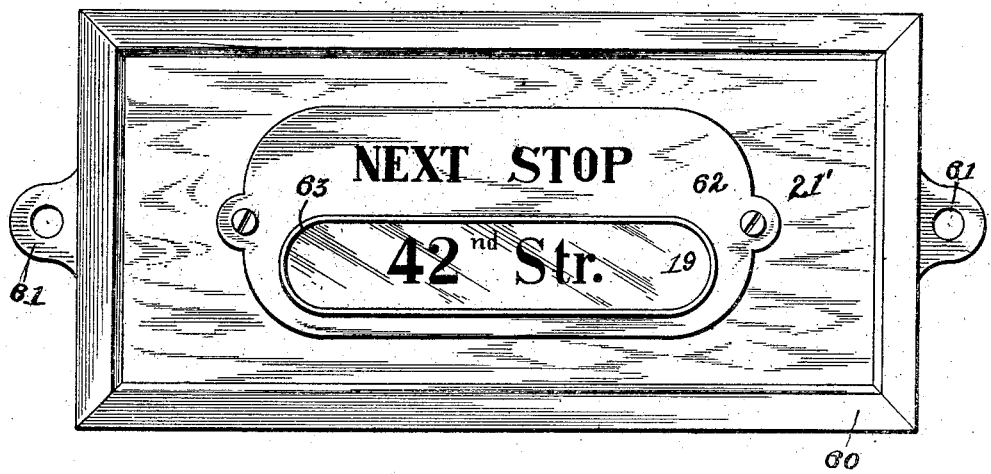
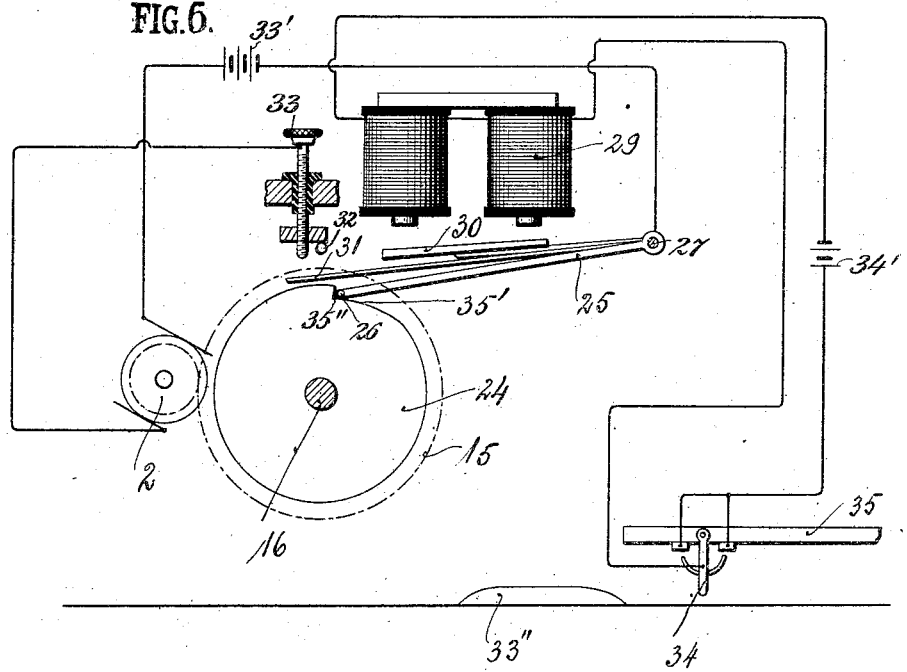

S. B. MOSCOVITZ.
EXHIBITING APPARATUS.
APPLICATION FILED SEPT. 20, 1906.

942,008.

Patented Nov. 30, 1909.
5 SHEETS—SHEET 4.

Witnesses
Max B. A. Doring.
Johanne Daumberger.

Inventor
Samuel B. Moscovitz
By his Attorney
Max W. Ordmann

S. B. MOSCOVITZ.
EXHIBITING APPARATUS.
APPLICATION FILED SEPT. 20, 1906.

942,008.

Patented Nov. 30, 1909.
5 SHEETS—SHEET 5.

Witnesses:
Wm J Chipman.

S. B. Moscovitz.
Inventor
By His Attorney

UNITED STATES PATENT OFFICE.

SAMUEL B. MOSCOVITZ, OF NEW YORK, N. Y.

EXHIBITING APPARATUS.

942,008.　　　　　Specification of Letters Patent.　　Patented Nov. 30, 1909.

Application filed September 20, 1906. Serial No. 335,412.

*To all whom it may concern:*

Be it known that I, SAMUEL B. MOSCOVITZ, a citizen of the United States, and a resident of the city of New York, county of New York, State of New York, have invented certain new and useful Improvements in Exhibiting Apparatus, of which the following is a specification.

The invention relates broadly to exhibiting apparatus, and more particularly to such apparatus in which an exhibiting device is moved intermittently to exhibit or remove an indication, which indication may be of any nature conveying an idea, as, for instance, the name or number of a station.

An object of the invention is to effect the exhibit of the indication economically, and, more particularly, to provide in an electric motor driven apparatus, means whereby stored energy of momentum alone effects a movement of the exhibiting device, instead of being wastefully dissipated, as heretofore.

In the present embodiment, an exhibiting device in the form of a strip bearing indications is arranged intermittently to be shifted through measured distances across a sight opening or window. The shifting is accomplished by an electric motor for the source of mechanical power. Automatic means is provided for holding the motor circuit closed for a certain period and for breaking it before the strip has been shifted the complete measured distance. A suitably formed cam disk and follower is comprised in this automatic means.

A further object of the invention is to combine automatic means with the apparatus whereby the exhibiting strip may be brought to a positive stop upon being shifted the complete measured distance.

Still a further object is to provide for the shifting of the strip both in a forward and a backward direction by a reversible electric motor while providing for the automatic control of the motor circuit, namely, being held closed and being opened previous to complete shifting of the strip, independently of the direction of rotation of the motor.

Further objects of the invention will be pointed out in the accompanying claims and will be apparent from the following description and accompanying drawings. In the drawings there is illustrated both an apparatus capable of progressively feeding an indicating strip in one direction and also an apparatus capable in itself of feeding the indicating strip in either of two directions.

In the drawings, which form part of this application, like reference characters designate corresponding parts.

Figure 2:
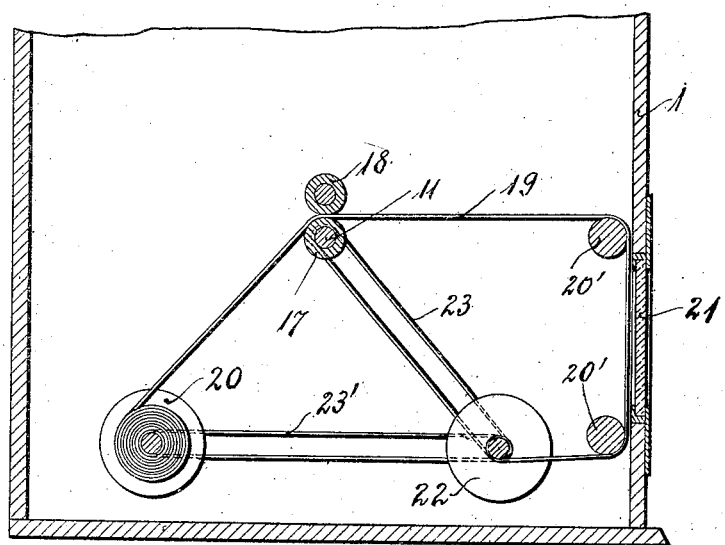
Figure 3:
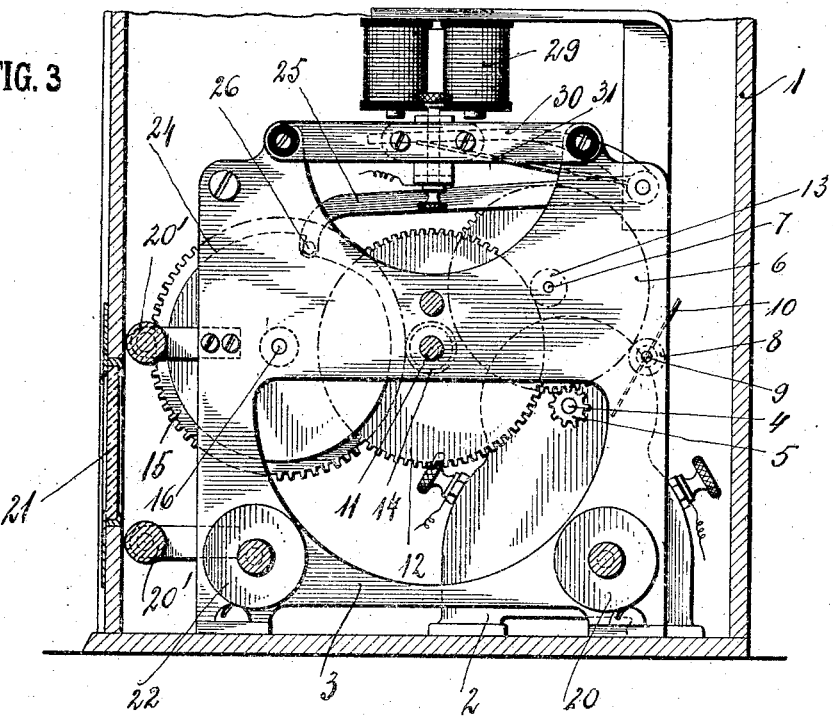
Figure 4:
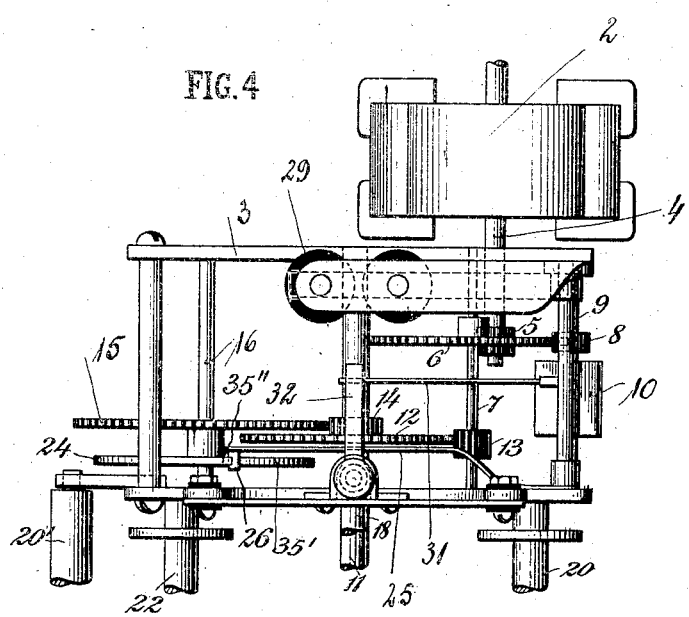
Figure 7:
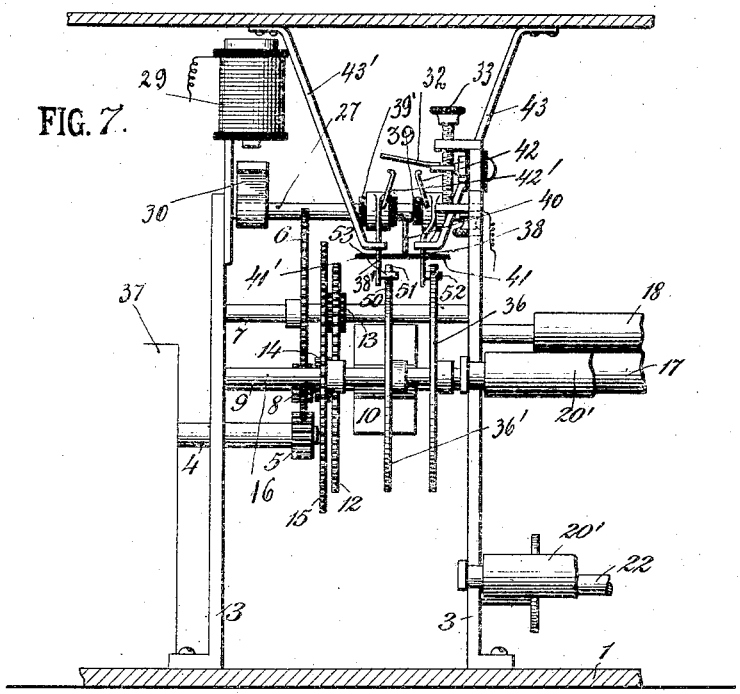
Figure 8:
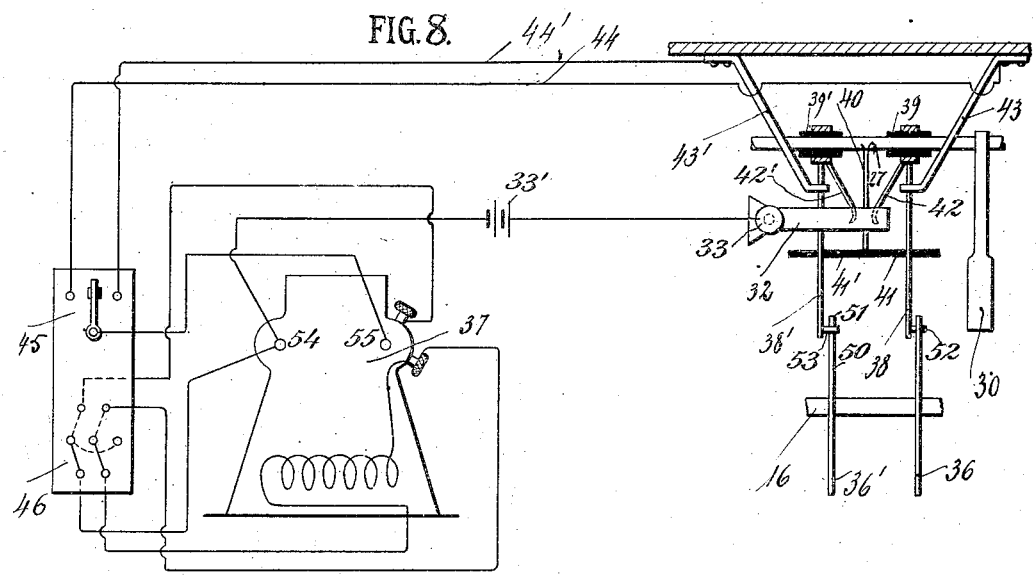
Figure 9:
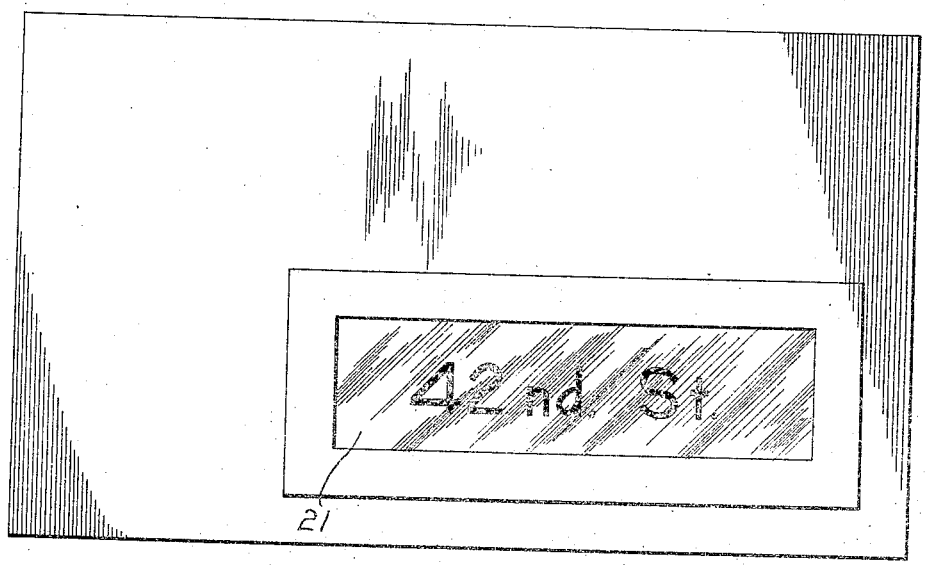
Figure 10:
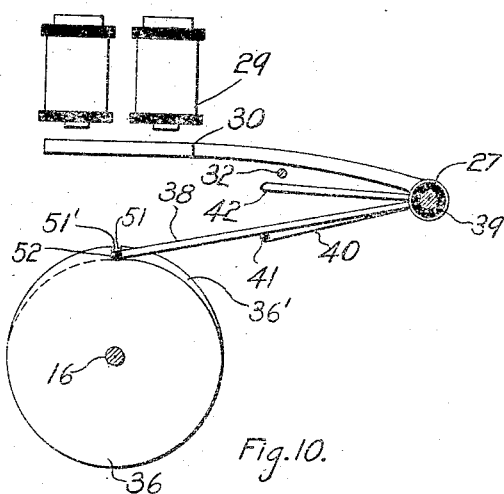

Figure 1 is a vertical section of the containing box, and showing the apparatus in front elevation. Fig. 2 is a cross section on line X—X of Fig. 1, looking from left to right. Fig. 3 is a cross section on line Y—Y of Fig. 1, looking from right to left. Fig. 4 is a plan view of the apparatus within the casing, and shown at the left of Fig. 1. Fig. 5 is a front elevation of a modified window plate construction. Fig. 6 is a diagram showing the circuit connections of the motor, starting magnet, &c. Fig. 7 is a fragmentary elevation of a modification of the apparatus shown at the left of Fig. 1. Fig. 8 is a diagram showing the circuit connections for the modification shown in Fig. 7. Fig. 9 is a front elevation of the apparatus. Fig. 10 is a fragmentary cross section through the shaft 16 of Fig. 7 showing the cams and follower parts.

Referring now more in detail to the drawings:—1 indicates a suitable casing for the apparatus, in which is mounted a suitable motor 2 illustrated in the form of an electric motor. 3 denotes a suitable supporting frame mounted on the casing 1, and for the purpose of supporting the driving mechanism, &c. 4 denotes the driving shaft of the motor 2 and has fixed to its free end the driving pinion 5 which meshes with the gear 6 carried on the shaft 7 rotatably mounted in the frame 3 and lying parallel to the motor shaft 4. The pinion 8 is fixed to the shaft 9 which is rotatably mounted at the rear of the frame 3 and carries the fly governor 10 which serves to control the speed of the electric motor.

Upon a central shaft 11, rotatably mounted in the frame 3, is fixed a gear 12 which is in mesh with and is driven by the pinion 13 fixed to the shaft 7, which, as has been described, also has fixed thereto the gear 6. Shaft 11 also has fixed thereto a pinion 14 that meshes with a gear 15 carried by the shaft 16 which is rotatably mounted in the forward part of the frame 3. Through this train of gears 5, 6, 13, 12, the shaft 11 is directly connected to the motor, and by the same train of gears and, in addition thereto, by the gears 14 and 15, the shaft 16 is directly connected to the motor.

The central shaft 11 is extended out beyond the frame 3 and longitudinally of the casing 1, and carries the feeding roller 17 fixed thereto (see Figs. 1 and 2). This roller lies beneath a superposed parallel roller 18 between which is threaded the indicating strip 19. The surface of the roller 17 (see Fig. 2) is so formed as to engage the exhibiting strip 19 in a manner capable of imparting movement thereto. This may be accomplished in any suitable manner, one instance of which is the providing of the roller 17 with a friction surface, as would be the case if the roller were made of rubber. It is to be understood, however, that any suitable means for causing the feeding roll 17 to move the strip 19 is contemplated. In the apparatus illustrated the roller 18 engages the opposite side of the indicating strip 19 from that engaged by the roller 17 and the reaction between the two rollers serves to provide a tight gripping action for the roller 17 against the indicating strip.

One end of the indicating strip may be secured to the winding roll 20, and the other end of the exhibiting strip, after passing over the guide rolls $20^1$—$20^1$ and before the transparent window 21, may be secured to the winding roll 22. Suitable power transmission means, which is shown in the form of a belt 23, belted from the roll 17 to the winding roll 22, is provided. Suitable power transmission means for the winding roll 20 is also provided and is illustrated in the form of a belt 23 passing from the winding roll 22 to the winding roll 20. As illustrated in Fig. 2, the winding roll 22 has a tendency to wind up the exhibiting strip, while 20 unwinds it by reason of the belts 23 and $23^1$ connecting these rolls to shaft 11. As indicated, the power transmission means for winding the rolls permits of a certain amount of slippage, which will in a measure compensate for the varying diameter of the exhibiting strip wound up on the winding rolls. The consequences of the varying diameter of the strip wound on the winding rolls may be compensated for in other ways well known in the art, the present embodiment being for purposes of illustration merely. It is to be understood, however, that the exhibiting strip is caused to be moved a measured distance by a feeding means, as the roll 17. Obviously, the measured distance which the exhibiting strip is caused to be moved is dependent, therefore, upon the number of rotations imparted to the feeding roll 17.

For determining the number of rotations upon an actuation of the apparatus, applicant has provided certain mechanism of which the disk 24 is a part. The disk 24 is fixed to the shaft 16 previously described as being driven by the pinion 14 meshing with the gear 15, which pinion and gear may be suitably proportioned so that for one rotation of the disk 24 the desired number of rotations of the feeding roll 17 required for feeding the exhibiting strip the measured distance may be secured. Figs. 1, 3, 4 and 6 show the parts coöperating with the disk 24 in normal positions. Formed by cutting out a portion of the periphery of the disk 24 is a cam surface $35^1$ which terminates in a radial shoulder $35^{11}$. As shown in Figs. 3 and 4, a follower or pin 26 engages the periphery of the disk 24 and is shown located against the shoulder $35^{11}$. This follower 26 is carried at the end of an arm 25, which is pivoted at its rear by the spindle 27 in the frame 3. The spindle 27 is rigidly secured to the arm 25 and there is also secured to the spindle 27 an extension arm from the armature 30 which is in operative relation to the starting magnet 29 carried on the bracket 28. Fixed to and extending out from the spindle 27 is a resilient contact arm 31. Carried by the frame 3 and insulated therefrom is a coöperating contact arm 32, which may be adjusted relatively to the arm 31 by means of the screw 33, which is likewise insulated from the frame 3.

A suitable traveling circuit closer 34 may be provided and this may be embodied as illustrated in Fig. 6 when the apparatus is to be used as a station indicator for cars or trains. In this instance a stationary block in any suitable form, such as that indicated at $33^{11}$ in Fig. 6, is provided so that the circuit closer 34 carried by the car indicated by 35 will contact with the block 33 and close the circuit indicated connecting the battery $34^1$ with the actuating magnet 29. The circuit closer 34 closes the circuit through and energizes the magnet 29 for just a sufficient period of time to cause the armature 30 to be attracted. The attraction of the armature 30 will cause the spindle 27 to rotate and elevate the arm 25, which carries the pin 26 clear of the shoulder $35^{11}$ and causes the contact arm 31 to contact with the coöperating contact arm 32. The parts 31—32 constitute a circuit closer for the operating circuit of motor 2, so that when the parts 31 and 32 contact with one another, current flows from the battery $33^1$ through the motor 2 to operate the same. As soon as the motor 2 starts moving the shoulder $35^{11}$ is caused to move beneath the follower or pin 26, so that upon the deënergization of the magnet 29 the pin 26 will not be permitted to drop back in front of the shoulder $35^{11}$, but merely engages the periphery of the concentric portion of the disk 24, the contact arm 31 thereby being maintained in contact with the arm 32, thus preserving the integrity of the motor circuit although the circuit for the actuating magnet 29 has been broken. The motor 2 continues to operate until the disk 24 has been rotated sufficiently for the follower 26 to follow down the cam surface 35¹ a sufficient amount to cause the arm 31 to break connection with the arm 32 and open the motor circuit. The exact moment of breaking the motor circuit within the limits of the cam face 35¹ may be determined by adjusting the screw 33, which moves the contact 32 relatively to the contact 31. It is desirable to break the motor circuit before the motor has caused the indicating strip to be moved its measured distance, and, consequently, before the disk 24 has completed one rotation. By this provision the momentum of the motor and the connecting parts is utilized to complete the movement of the exhibiting strip. The movement of the exhibiting strip, however, is positively checked when the disk 24 has completed one rotation by the shoulder 35¹¹ engaging against the pin or follower 26.

With the apparatus illustrated in Figs. 1 to 4 and 6, inclusive, it will be necessary to duplicate some of the parts in order to cause the feeding of the exhibiting strip in a reverse direction. To make this two direction feeding possible and to simplify the apparatus necessary, I have devised a modification of my mechanism as shown in Figs. 7 and 8, wherein two disks 36 and 36¹ are fixed to the shaft 16. The disk 36 corresponds in form to the disk 24. It also is positioned on shaft 16 in the same relative position as is disk 24. The disk 36¹ corresponds in form to the disk 24 and disk 36. However it is positioned upon shaft 16 reversely to disk 36 so that its shoulder 51 faces oppositely relatively to the similar shoulder of disk 36. In this modification two arms 38 and 38¹ take the place of the single arm 25 shown in Fig. 1. Pins or followers respectively indicated by 52 and 53 are fixed on these arms to engage the peripheries of the disks 36 and 36¹. The arms 38 and 38¹ are loosely mounted upon the spindle 27 upon insulating bearings 39—39¹ and are independently movable upon the spindle 27. An extension arm 40 extends out from the spindle 27 and is provided with laterally extending members 41 and 41¹ forming a T-like construction which extends under the arms 38 and 38¹, so that when the armature 30 is attracted by the magnet 29 to rotate the spindle 27, the members 41 and 41¹ serve to elevate the arms 38 and 38¹ and lift the followers 52 and 53 clear of the shoulder 51 and its companion formed in the disk 36. It should be understood that the arms 38—38¹ are suitably insulated from the disks 36—36¹ and the member 40, which may be accomplished by forming the parts 41, 41¹, 52 and 53 of insulation, as indicated. The contact piece 32 is present in this modification and likewise may be adjusted by the screw 33. The arm 42 fixed to move with the arm 38, coöperates with the arm 32 and the circuit connection for the arm 42 is through the spring arm 43, which bears against the rear of the arm 38. In a similar manner the arm 42¹ is fixed to the arm 38¹ to coöperate with the contact 32, and the circuit connection for the arm 42¹ is through the spring arm 43¹ bearing upon the arm 38¹. In this modification a reversible motor 37 is provided, while the train of gears connecting with its shaft 4 through the spur gear 5 may be the same as that previously described in connection with Figs. 1 to 4 and 6, inclusive. The circuit for the magnet 29 may be similar to that illustrated in Fig. 6. The battery 33¹ furnishes power for driving the motor 37 and one terminal is connected to the arm 32, as illustrated, while the other terminal leads directly to the armature terminal 54 of the motor 37, the other armature terminal 55 is connected to the movable member of a two-point switch 45, the respective contacts of which are connected by wires 44 and 44¹ to the spring arms 43 and 43¹, which have previously been described as being electrically connected to the contact arms 42 and 42¹. The field winding of the motor 37 is suitably connected to the reversing switch 46, as indicated, so that the direction of the current traversing the same from the battery 33¹ may be reversed in a manner well known in the art, by the operation of the reversing switch 46.

When the exhibiting strip is to be moved, the switches 45 and 46 are both shifted, say to the left—in which case the circuit closing arm 42 is a live contact, and the circuit closing arm 42¹ is dead. Upon the actuation of the electro magnet 29 to lift the armature 30, contact 42 is caused to connect with contact 32 to close the motor circuit and start the motor in operation. The movement of the armature 30 at the same time causes the members 41 and 41¹ to lift the pins 52 and 53 clear of the shoulders in the cam disks. The starting of the motor causes a rotation of both disks in a direction to cause the shoulder of disk 36 to pass under the pin 52. Although the actuating magnet 29 is only momentarily energized, the periphery of the disk 36 in engaging against the pin 52 maintains the contact 42 in electrical connection with the arm 32, although the arm 38¹ has been allowed to fall down again until its pin 53 engages the cam portion 50. The motor circuit is, therefore, maintained by the contacts 42 and 32 until a complete rotation of the disk 36 has been nearly accomplished, when, as has been heretofore described in connection with Figs. 1 to 4 and 6, inclusive, the motor circuit is broken to allow the momentum of the parts to complete the rotation of the disk 36 and to complete the feeding of the exhibiting strip a predetermined distance. The follower 52 serves as a positive stop by engaging the shoulder of the cam with the disk 36 when one complete rotation has been accomplished.

In case rotation in the opposite direction is desired, the switches 45 and 46 are shifted to the right in which case the contact arm 42 is dead and the contact arm 42¹ is alive and is capable of completing the motor circuit upon the actuation of the magnet 29, but in this case the pin 53 by being raised clear of the shoulder 51 permits the rotation of the disk 36¹ in an opposite direction to that previously acomplished. The motor circuit is cut off before complete rotation is accomplished, in a manner similar to that previously described for the disk 36 and the momentum completes the rotation.

It should be noted that when the apparatus has come to rest after movement in either direction, it is locked against movement in both directions, the shoulder on the disk 36 locking against movement in one direction and the shoulder on the disk 36¹ locking against movement in the other. On the other hand, the construction is rendered capable of cutting off the power current before a complete rotation in either direction and without otherwise increasing the number of parts described in connection with the first construction. The switches 45 and 46 may be operated in any well known manner to suit the convenience of the work which the apparatus is to perform and they may be located in any convenient position. If the apparatus is used as a station indicator for traveling cars, it is obvious that the train contact 34 will operate in an automatic manner upon engaging suitable stops 33″, and the desired indication would be caused to be displayed by the apparatus through the window 21. In this class of work the switches 45 and 46 need be operated only upon the return trip of the car or train. It is further to be understood that any desired number of the station indicators described may be employed. Applicant's invention is directed more particularly to the automatic control of power circuits for the individual motors driving the individual exhibiting strips.

In Fig. 5 there is shown a window plate construction comprising a frame 60 with ears 61 for attachment to the casing 1. A panel 21′ is mounted in frame 60 and mounted on the panel is an escutcheon plate 62 which bears a suitable permanent legend and provides an opening 63 which exposes the indicating strip 19. This construction may be substituted for the window 21 of Figs. 2, 3 and 9.

Although I have illustrated and described certain embodiments of my invention, I desire it to be understood that the same are for purposes of illustration merely and that many modifications within the scope of the accompanying claims are contemplated.

What I claim and desire to secure by Letters Patent is:—

1. In combination, an exhibiting strip; a feed roll for shifting said strip a measured distance; a motor for driving said feed roll; a source of energy for said motor; means for connecting said source of energy with said motor to cause the same to operate; means for causing said source to be automatically disconnected from said motor before said strip has been shifted said measured distance, whereby the momentum of the moving parts completes the shifting of the strip; and a stop for positively checking said shifting when said strip has been shifted said measured distance.

2. In combination, an exhibiting strip; a feed roll for shifting said strip a measured distance; a motor for driving said feed roll; a source of energy for said motor; means for connecting said source of energy with said motor to cause the same to operate; means for causing said source to be automatically disconnected from said motor before said strip has been shifted said measured distance, whereby the momentum of the moving parts completes the shifting of the strip; and means for positively checking the feeding of said strip when it has been fed said measured distance.

3. In combination, an exhibiting strip; a motor; means connected with said motor for shifting said strip a measured distance; a source of electric energy for said motor; a normally open circuit closer in circuit with said source and motor; an electro-magnetic device for closing said circuit closer; means independent from said electro-magnetic device for holding said circuit closer closed but automatically operable to effect the opening thereof before the motor has completely shifted said exhibiting strip the measured distance, whereby momentum completes the shifting of the strip; and means for positively checking the feeding of said strip when it has been fed said measured distance.

4. In combination, an exhibiting strip; a motor; means connected with said motor for shifting said strip a measured distance; a source of electric energy for said motor; a normally open circuit closer in circuit with said source and motor; an electro-magnetic device for closing said circuit closer; means independent from said electro-magnetic device for holding said circuit closer closed but automatically operable to effect the opening thereof before the motor has completely shifted said exhibiting strip the measured distance, whereby momentum completes the shifting of the strip, and means for adjusting said circuit closer whereby the time of its automatic opening may be varied.

5. In exhibiting apparatus, an exhibiting strip adapted to be moved and to come to rest alternately; movable means mechanically connected with said strip; a source of energy for imparting momentum to said movable means; provisions whereby momentum alone effects an appreciable movement of the indicating strip; and means for positively checking the continued movement of said strip.

6. In an electric motor driven exhibiting apparatus, an intermittently moved exhibiting device; controlling means whereby stored energy of momentum of all the driving parts alone is effective for causing an appreciable movement of said exhibiting device; and means for positively checking the continued movement of said strip.

7. In an electric motor driven exhibiting apparatus, an intermittently moved exhibiting device; adjustable automatic controlling means for the motor circuit whereby the motor circuit may be maintained for one of various predetermined periods and be broken before the exhibiting device has been completely moved.

8. In an electric motor driven exhibiting apparatus, a motor for the same, an intermittently moved exhibiting device; a circuit for said motor including a circuit closer adjustable automatic controlling means, comprising a cam disk and a follower for actuating said circuit closer of the motor circuit, whereby the motor circuit may be maintained for one of various predetermined periods and be broken before the exhibiting device has been completely moved.

9. In combination, an exhibiting strip; a reversible electric motor; means connected with said motor for shifting said strip a measured distance in either a forward or a backward direction according to the direction of rotation of said motor; a normally open power circuit for said motor; electromagnetic means for momentarily closing said motor circuit; automatic means for holding said motor circuit closed independently of said electro-magnetic means and operative for both directions of rotation of said motor, said automatic means having provisions for effecting the automatic opening of the motor circuit at a predetermined point before said strip has been shifted the complete measured distance, either forward or backward.

10. In combination, an exhibiting strip; a reversible electric motor; a feeding roll for said strip; power transmitting gearing connecting said motor and said feeding roll; a normally open power circuit for said motor; an electro-magnet for momentarily closing said motor circuit to start the motor; automatic controlling means for the motor circuit comprising two circular disks fixed to a shaft geared to said feeding roll, each disk having a portion at its periphery cut away and providing a radial shoulder, the shoulders being oppositely disposed on the two disks; a follower member for each disk engaging the periphery thereof and normally resting in said cut out portions; circuit closing means for the motor circuit adapted to be closed when the corresponding follower member rests upon the circular periphery of its disk, and which circuit closer is adapted to be opened when said follower reënters said cut out portion, whereby, for both directions of rotation the power circuit of the motor may be automatically held closed for a definite period and may be automatically broken before said motor has effected a complete rotation of said disks in either direction.

11. In exhibiting apparatus, a reversible motor; motor driven parts; an automatic controller for said motor, comprising two cam disks fixed to be rotated proportionately to the movement of said driven parts, each disk having a cut out portion oppositely disposed to that on the other disk, and providing for the respective disks oppositely arranged shoulders, and a follower for each disk, each normally lying against a shoulder itself individually to prevent rotation in one of two opposite directions, while itself permitting rotation in the opposite direction.

12. In exhibiting apparatus, a reversible motor; motor driven parts; an automatic controller for said motor, comprising two cam disks fixed to be rotated proportionately to the movement of said driven parts, each disk having a cut out portion oppositely disposed to that on the other disk, and providing for the respective disks oppositely arranged shoulders, and a follower for each disk, to engage the periphery thereof, and of a less width than the peripheral extent of said cut out portion, and each normally lying against a shoulder to prevent rotation in one direction.

Signed at New York this 19 day of September 1909.

SAMUEL B. MOSCOVITZ.

Witnesses:
JOSEPH E. CAVANAUGH,
MAX D. ORDMANN.